United States Patent [19]
Bofinger et al.

[11] Patent Number: 4,699,636
[45] Date of Patent: Oct. 13, 1987

[54] PROCESS FOR OUTGASSING LIQUID-CRYSTALLINE MATERIALS

[75] Inventors: Klaus Bofinger, Muehltal; Hans A. Kurmeier, Seeheim-Jugenheim; Michael Römer, Rodgau; Jürgen Seubert, Darmstadt-Eberstadt, all of Fed. Rep. of Germany

[73] Assignee: Merck Patent Gesellschaft mit beschrankter Haftung, Darmstadt, Fed. Rep. of Germany

[21] Appl. No.: 829,244

[22] Filed: Feb. 14, 1986

[30] Foreign Application Priority Data

Feb. 14, 1985 [DE] Fed. Rep. of Germany ....... 3505001

[51] Int. Cl.$^4$ .............................................. B01D 19/00
[52] U.S. Cl. .......................................... 55/38; 55/42; 55/52; 55/55; 55/189; 159/11.1
[58] Field of Search ................... 55/38, 40, 41, 42, 55, 55/15, 52, 189, 277; 159/11.1, DIG. 16

[56] References Cited

U.S. PATENT DOCUMENTS

| | | | |
|---|---|---|---|
| 3,242,643 | 3/1966 | Moore et al. | 55/52 X |
| 3,420,156 | 1/1969 | Anders | 159/11.1 X |
| 3,853,500 | 10/1974 | Gassmann et al. | 55/15 |
| 3,904,392 | 9/1975 | VanIngen et al. | 55/15 |
| 3,915,712 | 10/1975 | Herzhoff et al. | 159/DIG. 16 X |
| 4,205,966 | 1/1980 | Horikawa | 55/15 |

Primary Examiner—Charles Hart
Attorney, Agent, or Firm—Millen & White

[57] ABSTRACT

Liquid-crystalline materials can be outgassed by thermal treatment under reduced pressure in a thin-layer evaporator or with additional ultrasonic treatment.

25 Claims, No Drawings

PROCESS FOR OUTGASSING LIQUID-CRYSTALLINE MATERIALS

BACKGROUND OF THE INVENTION

This invention relates to a process for outgassing liquid-crystalline materials by a thermal treatment under reduced pressure.

Liquid-crystalline materials are widely used industrially in the manufacture of opto-electronic components. In such display systems, the liquid-crystalline material is present in 5–30 μm thick layers between two transparent electrodes.

Liquid-crystalline materials which frequently can consist not of only one component but can represent a mixture of up to more than 20 individual components, are viscous liquids which are capable of dissolving considerable amounts of inert gas. These dissolved gas fractions can escape again from the liquid-crystalline material, during or after the step of filling the display elements, with destruction of optical homogeneity, and can lead to the formation of bubbles, whereby the particular display element becomes useless. Particularly when large-area display elements are filled, this entails high reject rates in the production sequence.

The conventional process for outgassing liquids by applying a reduced pressure turns out to be very protracted and incomplete due to the viscous nature of the material which is to be outgassed.

There is therefore a demand for a process for an effective and complete outgassing of liquid-crystalline materials.

SUMMARY OF THE INVENTION

Thus it is an object of this invention to provide such a process.

Upon further study of the specification and appended claims, further objects and advantages of this invention will become apparent to those skilled in the art.

These objects have been achieved for this invention relating to a process for outgassing liquid-crystalline materials by thermal treatment under reduced pressure, which is characterized in that the material to be outgassed is charged to a thin-layer evaporator or that an ultrasonic treatment is additionally carried out.

DETAILED DESCRIPTION

A reduction in viscosity, promoting the outgassing of liquids, can be effected, for example, by raising the temperature. However, because of the frequently complicated structural composition of liquid-crystalline materials for the production of opto-electronic display elements and hence widely diverging differences in the physical properties of the individual components, in particular their vapor pressures, it had to be expected that the quantitive composition of these materials would change as a consequence of such treatment, due to their different volatilities.

It was therefore the more surprising that liquid-crystalline materials and in particular liquid-crystalline multi-component mixtures can be effectively and completely outgassed by charging them to a thin-layer evaporator at an elevated temperature and under a reduced pressure.

Thin-layer evaporators are normally used for the distillation or concentration of highly viscous, high-boiling materials. They consist of a heated upright cylinder with a built-in rotor. The liquid which is to be evaporated is charged to the heat exchange surface, is picked up by mobile wipers or stirrer blades and is thus distributed as a thin film over the evaporator surface. Under the action of gravity, the liquid which is to be evaporated flows downwards, the residence times of the heat exchange surface ranging from a few seconds up to several minutes. The evaporated material is withdrawn and passed to a condensation.

When a thin-layer evaporator is used according to the invention for outgassing liquid-crystalline materials, the temperature rise is selected such that, on the one hand, a sufficient reduction in viscosity permits a rapid through-put and, on the other hand, the outgassing is as complete as possible. To prevent evaporation losses, the reduction in pressure is matched to the temperature used. The magnitude of the temperature increase depends on the viscosity of the material which is to be outgassed, but it is not critical. In general, the process according to the invention is carried out at 10°, to 100° C., preferably at 20° to 60° C., and in particular at 20° to 40° C. The pressures applied correspondingly are $9 \times 10^4$ to 1 Pa, preferably $5 \times 10^4$ to 10 Pa, and in particular $5 \times 10^4$ to 100 Pa. Typical residence times are from a few seconds to several minutes, viscosities at the elevated temperature being adjusted accordingly.

Precise lower viscosities and/or layer thickness to be achieved are not critical, but are routinely determined in accordance with preliminary experiments to achieve an efficent outgassing in accordance with this invention. Typical ranges are from 1–5000 mPa×s for viscosity and/or from 0,1 to 1 mm for layer thickness. The process is carried out in a simple manner. Material charged to the heat exchange surface via a distributor can, after outgassing has taken place at suitable values of pressure and temperature, be withdrawn from the concentrate outlet. Material thus treated is virtually gas-free and is suitable for filling into display elements, in particular those having large surface areas.

In a further procedure for outgassing liquid-crystalline materials by thermal treatment under reduced pressure, ultrasonics are supplied simultaneously with this treatment. In this case, the micro-bubbles of gas present in the liquid are excited to vibrate and grow due to a concentration difference between the bubble surface and the surrounding liquid. The bubbles are expelled from the liquid by buoyancy or mechanical motion.

The combination of a temperature increase, reduction in pressure and ultrasonic treatment provides a particularly effective process for outgassing liquid-crystalline materials. To carry out this process, the ultrasonic field acting on the liquid, located in a vessel suitable for heating and pressure reduction, can be generated inside or outside the outgassing vessel. The process can also be arranged to be continuous, by passing the material which is to be outgassed, for example, through heated pipes subjected to a reduced pressure and at the same time exposing the material to an ultrasonic field. By varying the temperature, pressure and flow velocity as process parameters, effective and complete outgassing corresponding to the requirements to be met by the material is achieved. Typical ranges for ultrasonic frequencies and/or power applied are 20 to 100 kHz and/or 10 to 1000 W. Most conveniently ultrasonic fields are generated by commercially available laboratory or industrial ultrasonic cleaning tanks.

A special embodiment of the process according to the invention is characterized in that the material to be outgassed is stirred in a rotary evaporator in an ultrasonic bath.

In the rotary evaporator, a flask partially immersed in the heating bath rotates about its axis which is inclined to the horizontal. Due to the only partial filling of the flask and its rotation, the liquid present therein is distributed over the periphery. This results in a smaller layer thickness, promoting the outgassing step, and in more intensive mixing of the contents of the flask.

In this procedure, the ultrasonic field is preferably generated by an ultrasonic bath, such as is used, for example, for cleaning purposes. The heatable medium, filling the bath, at the same time effects an increase in the temperature of the flask contents which are to be outgassed. The temperatures and pressure applied are preferably adjusted to the composition and viscosity of the particular liquid-crystalline material, so that the ranges and preferred ranges already indicated for the outgassing by means of a thin layer evaporator equally apply to this process embodiment.

With a duration of the outgassing step of usually 15 to 60 minutes, but in most cases only 15 to 30 minutes, a virtually gas-free liquid-crystalline material, the original composition of which is unchanged, is likewise obtained, and this is suitable for filling display elements, in particular those having large surface areas.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

EXAMPLE 1

1 kg of a liquid crystal material, consisting of 20 parts by weight of a 4-(4-ethylcyclohexyl)-cyanobenzene, 10 parts by weight of 4-(4-butylcyclohexyl)-cyanobenzene, 20 parts by weight of 4-(4-propylcyclohexyl)-phenyl 4-butylcyclohexanecarboxylate, 15 parts by weight of 4-(4-pentylcyclohexyl)-phenyl 4-butylcyclohexanecarboxylate, 13 parts by weight of 4-ethyl-4'-cyanobiphenyl and 22 parts by weight of 4-butyl-4'-cyanobiphenyl, is charged within one hour at a temperature of the heat exchange surface of 25° to 30° C. and under pressure of $10^4$ Pa to a thin layer evaporator having a heating area of 0.2 m$^2$.

The product which has run through has a quantitative composition which is unchanged compared with the feed material, and is suitable for filling display elements.

EXAMPLE 2

1 kg of a liquid crystal material of the composition indicated in example 1 is stirred in a 2 l flask in a rotary evaporator at 25° to 30° C. and under $2\times10^3$ Pa in an ultrasonic bath for 15 to 30 minutes.

After this treatment, the liquid crystal material is suitable for the production of opto-electronic display elements.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for outgassing a liquid-crystalline material comprised of a plurality of individual components and having inert gas dissolved therein; the process comprising the steps of distributing the material in a thin-layer on a moving surface while flowing the material on the surface and while elevating the temperature of the material to within the range of 10° to 100° C. and reducing pressure of the atmosphere interfacing the material to a range of $9\times10^4$ to 1 Pa.

2. A process of claim 1 wherein the material is exposed to a temperature of 10°–100° C.

3. A process of claim 1 wherein the material is exposed to a temperature of 20°–60° C.

4. A process of claim 1 wherein the material is exposed to a temperature of 20°–40° C.

5. A process of claim 1 wherein the reduced pressure is about $9\times10^4$ to 10 Pa.

6. A process of claim 2 wherein the reduced pressure is about $9\times10^4$ to 1 Pa.

7. A process of claim 2 wherein the reduced pressure is about $5\times10^4$ to 10 Pa.

8. A process of claim 2 wherein the reduced pressure is about $5\times10^4$ to 100 Pa.

9. A process of claim 2 further comprising simultaneously exposing the liquid crystalline material to an ultrasonic field.

10. A process of claim 5 further comprising simultaneously exposing the liquid crystalline material to an ultrasonic field.

11. A process of claim 9, wherein the material is outgassed by stirring it in a rotary evaporator in an ultrasonic bath.

12. A process of claim 5, wherein the material is outgassed by stirring it in a rotary evaporator in an ultrasonic bath.

13. A process of claim 1 wherein said outgassing is performed in a rotary evaporator.

14. The process of claim 13 wherein the material has a viscosity in the range of 1–5000 mPaXs and the layer has a thickness in the range of 0.1 to 1.0 mm.

15. The process of claim 14 wherein the temperature range is 20° to 60° C.

16. The process of claim 14 wherein the temperature range is 20° to 40° C.

17. The process of claim 14 wherein the pressure range is $5\times10^4$ to 10 Pa.

18. The process of claim 14 wherein the pressure range is $5\times10^4$ to 100 Pa.

19. The process of claim 15 wherein the process is continued for up to one hour.

20. The process of claim 1, wherein the moving surface is a surface of a vertically disposed rotor upon which the film of material is deposited by wipers and along which the material flows.

21. The process of claim 1 further including the step of ultrasonically exciting the material to encourage outgassing of the inert gas.

22. The process of claim 21 wherein the process has a duration in the range of 15 to 60 minutes.

23. The process of claim 21 wherein the process has a duration of 15 to 30 minutes.

24. The process of claim 21 wherein the ultrasonic, material distributing and heating steps are accomplished by retaining the material in a container having an inside surface; immersing the container on a heat bath; ultrasonically exiting the bath, and rotating the container about a tilted axis to distribute the film of material on the inside surface of the container.

25. The process of claim 24 wherein the bath is ultrasonically excited at a frequency in the range of 20 to 100 KHZ and a with power in the range of 10 to 1000 watts.

* * * * *